(12) United States Patent
Wei

(10) Patent No.: US 11,537,605 B2
(45) Date of Patent: Dec. 27, 2022

(54) METHOD, APPARATUS, AND SYSTEM FOR AUTO-REGISTRATION OF NESTED TABLES FROM UNSTRUCTURED CELL ASSOCIATION FOR TABLE-BASED DOCUMENTATION

(71) Applicant: KONICA MINOLTA BUSINESS SOLUTIONS U.S.A., INC., San Mateo, CA (US)

(72) Inventor: Junchao Wei, San Mateo, CA (US)

(73) Assignee: KONICA MINOLTA BUSINESS SOLUTIONS U.S.A., INC., San Mateo, CA (US)

( * ) Notice: Subject to any disclaimer, the term of this patent is extended or adjusted under 35 U.S.C. 154(b) by 93 days.

(21) Appl. No.: 17/218,028

(22) Filed: Mar. 30, 2021

(65) Prior Publication Data

US 2022/0318235 A1  Oct. 6, 2022

(51) Int. Cl.
*G06F 16/242* (2019.01)
*G06F 16/22* (2019.01)
*G06N 3/08* (2006.01)
*G06F 16/25* (2019.01)

(52) U.S. Cl.
CPC ......... *G06F 16/244* (2019.01); *G06F 16/221* (2019.01); *G06F 16/2282* (2019.01); *G06F 16/256* (2019.01); *G06N 3/08* (2013.01)

(58) Field of Classification Search
CPC ........ G06F 16/35; G06F 40/186; G06F 16/20; G06F 16/30; G06F 16/256; G06F 16/244; G06F 16/2282
USPC ......................................................... 707/737
See application file for complete search history.

(56) References Cited

U.S. PATENT DOCUMENTS

| | | | | |
|---|---|---|---|---|
| 8,793,249 B2 * | 7/2014 | Lai | ...................... | G06F 16/9535 706/20 |
| 2013/0259375 A1 * | 10/2013 | Dunlop | .................. | G06V 20/35 382/173 |
| 2020/0042785 A1 * | 2/2020 | Burdick | ............... | G06V 30/416 |
| 2021/0090694 A1 * | 3/2021 | Colley | .................. | G16B 40/00 |

\* cited by examiner

*Primary Examiner* — Hung T Vy
(74) *Attorney, Agent, or Firm* — Squire Patton Boggs (US) LLP

(57) ABSTRACT

In some forms containing keywords and content, there may be nested levels of keywords, also referred to as a hierarchy. Content in the forms may be associated with one or more keywords in one or more of the nested levels, or in the hierarchy. Identifying keywords in adjacent cells in a table (with a nested keyword being either to the right of or below another keyword) enables distinguishing between keywords and content in filled forms, and enables correct association of content with respective keywords.

20 Claims, 13 Drawing Sheets

Order Form for XYZ Company Widgets

101

Date: Day Mo Yr
Order Taken By:

110  115  120  125

ABC Factory Inc.
1245 Appaloca Drive
Tuscaloosa, AL 34567

A C C T 130  140  150  160  170

| Order Date | Widget Type | Quantity | Unit Price | Deliver by |
|---|---|---|---|---|
|  |  |  |  |  |
|  |  |  |  |  |
|  |  |  |  |  |

Additional Notes: 135A-D  145A-D  155A-D  165A-D  175A-D 180
181

185  186A-C  187A-C  190  191  192  193

151

| Orders | Avg. Price |  | Delivery Charge | Std. | Exped. | Overnt. |
|---|---|---|---|---|---|---|
|  | Disc. |  |  |  |  |  |
|  | Net |  |  |  |  |  |

Order Form for XYZ Company Widgets

Date: Day 31 Mo 01 Yr 2021
Order Taken By: J. JONES

110    115    120    125

| ABC Factory Inc.<br>1245 Appaloca Drive<br>Tuscaloosa, AL 34567 | SHIPMENT<br>FOB TUSCALOOSA<br>ATTN. XYZ DOCK<br>GATE D | A<br>C<br>C<br>T | 24680-<br>13579<br>MS. SMITH |
|---|---|---|---|

130    140    150    160    170

| Order Date | Widget Type | Quantity | Unit Price | Deliver by |
|---|---|---|---|---|
| 02-02-2021 | BLUE BIRD | 1000 | $10 | 02-10-2021 |
| 03-03-2021 | PINK PARROT | 1500 | $20 | 03-15-2021 |
| 04-04-2021 | RED ROBIN | 2000 | $30 | 04-20-2021 |
| 05-05-2021 | GREEN GHOST | 2500 | $40 | 05-25-2021 |

Additional Notes:   135A-D   145A-D   155A-D   165A-D   175A-D

45-DAY TERMS
10% DISCOUNT FOR PAYMENT WITHIN 30 DAYS      180
1% PENALTY/MONTH FOR PAYMENT AFTER 60 DAYS   181

185   186A-C   187A-C   190   191   192   193

| Orders | Avg. Price | 50,000 | Delivery Charge | Std. | Exped. | Overnt. |
|---|---|---|---|---|---|---|
|  | Disc. | 5,000 |  | 100 | 200 | 400 |
|  | Net | 45,000 |  |  |  |  |

Order Form for XYZ Company Widgets

Date: Day 31 Mo 01 Yr 2021
Order Taken By: J. JONES

110     115     120     125

| ABC Factory Inc.<br>1245 Appaloca Drive<br>Tuscaloosa, AL 34567 | SHIPMENT<br>FOB TUSCALOOSA<br>ATTN. XYZ DOCK<br>GATE D | A C C T | 24680-<br>13579<br>MS. SMITH |
|---|---|---|---|

130     140     150     160     170

| Order Date | Widget Type | Quantity | Unit Price | Deliver by |
|---|---|---|---|---|
| 02-02-2021 | BLUE BIRD | 1000 | $10 | 02-10-2021 |
| 03-03-2021 | PINK PARROT | 1500 | $20 | 03-15-2021 |
| 04-04-2021 | RED ROBIN | 2000 | $30 | 04-20-2021 |
| 05-05-2021 | GREEN GHOST | 2500 | $40 | 05-25-2021 |

Additional Notes:    135A-D    145A-D    155A-D    165A-D    175A-D

45-DAY TERMS
10% DISCOUNT FOR PAYMENT WITHIN 30 DAYS — 180
1% PENALTY/MONTH FOR PAYMENT AFTER 60 DAYS — 181

185    186A-C    187A-C    190    191    192    193

| Orders | Avg. Price | 50,000 | Dollars | Delivery Charge | Std. | Exped. | Overnt. |
|---|---|---|---|---|---|---|---|
| | Disc. | 5,000 | Dollars | | 100 | 200 | 400 |
| | Net | 45,000 | Dollars | | | | |

| Word1 | Word5 | | | | |
|---|---|---|---|---|---|
| Word2 | Word6 | | Word7 | | |
| Word3 | | | | | |
| Word4 | | | | | |

| C0 | C1 | | | | |
|---|---|---|---|---|---|
| C2 | C3 | | C4 | | |
| | C5 | C6 | C7 | | C8 |
| C9 | C10 | C11 | C12 | C13 | C14 |

FIG. 4C

| C0 | C1 | | | | |
|---|---|---|---|---|---|
| C2 | C3 | | C4 | | |
| | C5 | C6 | C7 | | C8 |
| C9 | C10 | C11 | C12 | C13 | C14 |

FIG. 4D

| C0 | C1 | | | | |
|---|---|---|---|---|---|
| C2 | C3 | | C4 | | |
| | C5 | C6 | C7 | | C8 |
| C9 | C10 | C11 | C12 | C13 | C14 |

FIG. 4E

METHOD, APPARATUS, AND SYSTEM FOR AUTO-REGISTRATION OF NESTED TABLES FROM UNSTRUCTURED CELL ASSOCIATION FOR TABLE-BASED DOCUMENTATION

CROSS-REFERENCE TO RELATED APPLICATIONS

The present application is related to U.S. application Ser. No. 17/218,026, filed Mar. 30, 2021, entitled "Method, Apparatus, and System for Auto Form—Registration Using Virtual Table Generation and Association". The present application incorporates all of this related application by reference in its entirety.

BACKGROUND OF THE INVENTION

Automatic registration of forms can be challenging, particularly when identifying and associating keywords and content. Here, keywords may be text that may be associated with a particular field of a form, in which certain types of data (content) may be expected in order to fill that particular form field. A keyword may be considered to be a header of or for a field, and the content may be considered to be data that goes into that field. Content may occupy one or more fields if it comprises more than one line in a filled-in form.

When an empty (blank) form or template is available, keywords (field headers) may be identified fairly readily. The visibility of the keywords facilitates association of the keywords with each other, for example, in a spatial (left/right, up/down) relationship, which also may be termed a geometrical relationship.

There are rules to enable association of keywords going from left to right or from up to down without using table information. Those rules are relatively easily implemented for fixed forms, for example, forms with regular rows and columns in some kind of tabular format. However, as forms become more and more complicated, such association becomes more difficult. For example, with a so-called floating form, keywords may not appear in uniform or regular locations. For example, the keywords may not appear in a single table, or may not appear in consistent locations in the form. In one aspect, the keywords may appear in multiple tabular formats throughout the form. In another aspect, these multiple tabular formats may not all be the same, or may be different from each other. Thus, there may be different tabular formats within a single form. Because of irregular location of keywords, there can be exceptions to otherwise might be fixed rules of association of keywords and content. As a result, there can be a failure to associate keywords with content accurately.

Modifying existing fixed rules to account for floating forms can cause problems when applying those modified rules to earlier examples (e.g. fixed forms). It is not easy to modify those rules without potentially breaking early tested working cases. The above-referenced copending application provides a more robust and unified algorithm to address these and other issues, and seeks to extend the algorithm subsequently for what might be considered completely free form registration of keywords and content, that is, where keywords might appear anywhere on a form, and content may appear either to the right of or below a keyword.

It would be desirable to extract core information from a structured form that contains multiple pairs of keywords and content, to make it possible to provide automatic association between keywords and content by finding relations between the two in a given form.

SUMMARY OF THE INVENTION

To address the above and other issues, aspects of the present invention enable design of an auto-registration capability inside a table, using cell structure in the table. Other aspects enable building of a hierarchical data structure to represent relationships between keywords and content. Still other aspects enable automatic association of nested keywords with their content based on input, and solution of problems arising from multiple levels of keywords in a database.

Aspects according to the invention provide for design of auto-registration inside a table, using the table's cell structure. In other aspects, a hierarchical data structure may be constructed to represent a relationship between keywords and associated content. In further aspects, nested keywords may be associated automatically with content based on input, to resolve instances of multi-level keywords in a database.

BRIEF DESCRIPTION OF THE DRAWINGS

FIG. 1A shows an example of a blank form; FIG. 1B shows the blank form filled in, as an input image; and FIG. 1C shows an example of a target image;

FIGS. 4A to 4E show organizations of words and cells in a table according to embodiments;

DETAILED DESCRIPTION

Figures 2A, 2B:
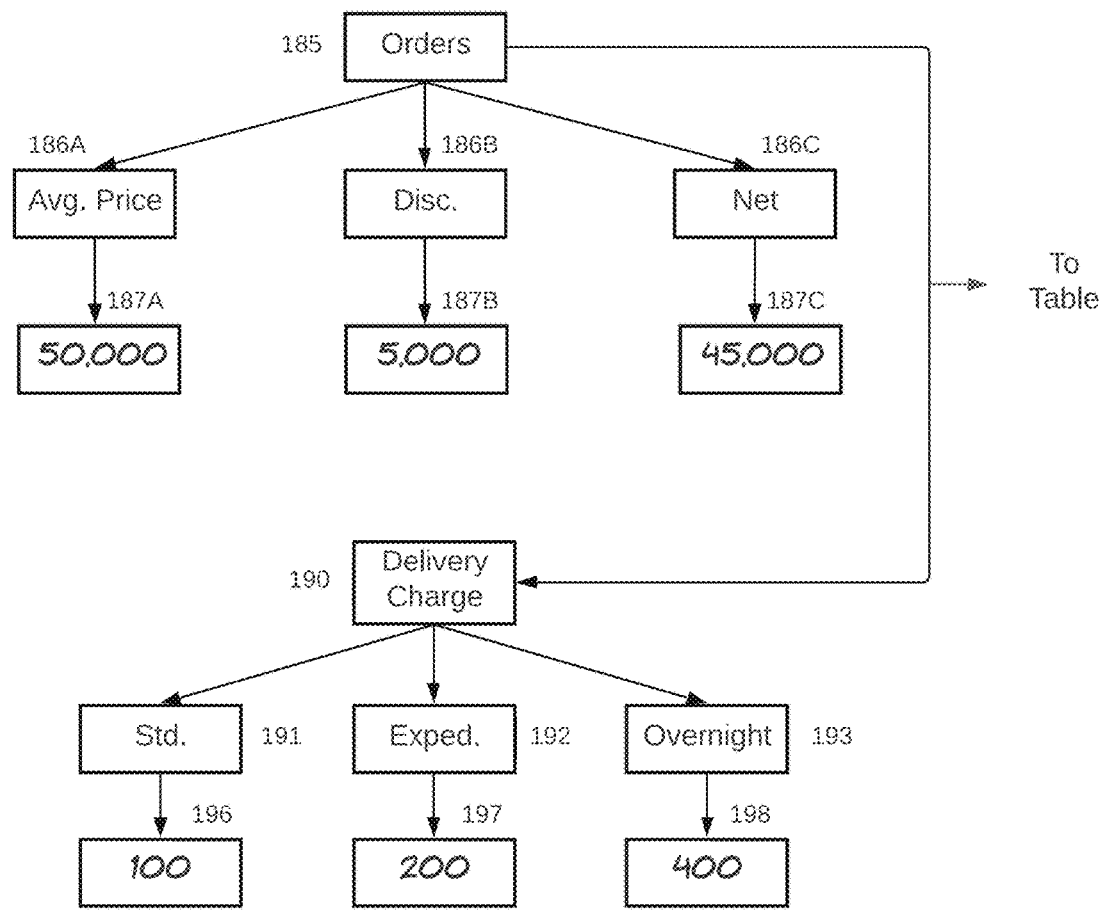
FIG. 2A shows a blown-up portion of FIG. 1C.
FIG. 2B is an example of a hierarchy or tree formed with fields from FIG. 2A.

As will be described in more detail herein, aspects of the invention relate to a form auto-registration method, and to a form auto-registration system employing the method. In an embodiment, the form auto-registration system comprises:
  one or more processors;
  one or more non-transitory memory devices; and
  a deep learning system which implements a deep learning model.

In an embodiment, the form auto-registration system stores one or more programs containing instructions which, when executed, perform the following:
  responsive to an input of a form, extracting one or more features from the form;

using a deep learning model, identifying lines from other features in the form, and extracting the lines;

using the deep learning model, identifying and extracting connected regions using the extracted lines;

using the deep learning model, identifying a table from the connected regions;

extracting cells from the identified table;

grouping the cells of the identified table using locations and sizes of adjacent cells in the identified table;

forming rows and columns in the identified table;

forming a hierarchy for the cells in the identified table using the grouping and one of the formed rows and the formed columns;

identifying adjacent keywords in the identified table using the formed hierarchy;

identifying content in the identified table using the formed hierarchy; and associating respective identified adjacent keywords with respective identified content.

In an embodiment, the formed hierarchy in the identified table may be a column hierarchy, with respective identified content appearing below identified adjacent keywords.

In an embodiment, the formed hierarchy in the identified table may be a row hierarchy, with respective identified content appearing to the right of identified adjacent keywords.

In an embodiment, the deep learning model may be selected from the group consisting of convolutional neural networks.

In an embodiment, the features may be selected from the group consisting of a single color, multiple colors, or grayscale, and the identifying and extracting of lines comprises identifying one or more shaded regions in the form as a single color, multiple colors, or grayscale.

In an embodiment, the extracting of cells may include extracting of one or more cells from the one or more shaded regions.

In an embodiment, the extracting of the one or more cells from the one or more shaded regions may further use the extracted lines.

In an embodiment, the formed hierarchy may be represented in a format selected from the group consisting of JavaScript Object Notation (JSON), hypertext markup language (HTML), and extensible markup language (XML).

In an embodiment, the associating may comprise determining that content is associated with a particular keyword by identifying a lowest cost value $C_{ij}$, wherein $C_{ij}$ is determined as follows:

$$C_{ij} = \alpha \cdot G_{ij} + \beta \cdot S_{ij}$$

$\alpha, \beta$—weights $$G_{ij} = \sqrt{(x_i - x_j)^2 + (y_i - y_j)^2}$$

$x_i, y_i$—Position of Keyword i $x_j, y_j$—Position of Content j $G_{ij}$—Geometric Distance between keyword i and content j $S_{ij}$—Semantic Distance between keyword i and content j.

In an embodiment, the semantic distance $S_{ij}$ may be computed as a distance selected from the group consisting of a geometric distance, a forward rank (FR), a backward rank (BR), an arithmetic average of FR and BR, a geometric average of FR and BR, an harmonic average of FR and BR, a Euclidean distance, a word mover's distance, or a cosine distance.

FIG. 1A shows a blank form according to an embodiment. In this instance, the blank form potentially has two tables, indicated respectively as 101 at the top of the Figure, and 151 near the bottom of the Figure. In FIG. 1A, in table 101, block 115 would contain content associated with keywords 110, and block 125 would contain content associated with keyword 120. Keywords 130, 140, 150, 160, and 170 would be associated respectively with content in blocks 135A-D, 145A-D, 155A-D, 165A-D, and 175A-D, so that multiple pieces of content may be associated with a given keyword. Keywords 180 would be associated with content in block 181.

Near the bottom of FIG. 1A, in table 151, are what might be termed nested content. Blocks 187A-C would contain content that is associated with respective keywords 186A-C, which in turn are associated with keyword 185. Similarly, blocks 196-198 would contain content that is associated with respective keywords 191-193, which in turn are associated with keyword 190.

FIGS. 1B and 1C respectively show an example of an input image and a target image. FIG. 1B is the same as FIG. 1A, but with content added. The arrows in the target image of FIG. 1C indicate a direction in which contents may be identified for association with corresponding keywords. In the kind of multi-dimensional tables shown in FIGS. 1B and 1C, there are multiple contents that may be associated with a single keyword in a given column or a row, as for example in table 101. Also, there may be what is called a nested structure, in which multiple contents may be associated with more than one keyword to the left of the contents, or above the contents, as in table 151.

Looking more closely at FIG. 1B, the text in more scripted type is content, and the remaining text may be considered to be keywords. In an embodiment, bounding boxes may be placed around the keywords, to aid in identification of keywords in particular sections of the form. Comparing FIGS. 1B and 1C, keywords 110 are associated with content 115, and keyword 120 is associated with content 125. Keywords 130, 140, 150, 160, and 170 are associated respectively with content 135A-D, 145A-D, 155A-D, 165A-D, and 175A-D, so that multiple pieces of content are associated with a given keyword. Keywords 180 are associated with content 181.

Near the bottom of FIGS. 1A and 1B are what might be termed nested content. Again comparing FIGS. 1A and 1B, content 187A-C is associated with respective keywords 186A-C, which in turn are associated with keyword 185. Similarly, content 196-198 is associated with respective keywords 191-193, which in turn are associated with keyword 190.

According to aspects of the invention, it is possible to provide auto-registration inside a table, using the table's cell structure. In other aspects, a hierarchical data structure may be constructed to represent a relationship between keywords and associated content. In further aspects, nested keywords may be associated automatically with content based on input, to resolve instances of multi-level keywords in a database.

One example of a hierarchical data structure according to an embodiment now will be described as follows, beginning with FIGS. 2A and 2B. FIG. 2A is a bottom portion of FIG. 1C. FIG. 2B shows a breakdown of the structure of FIG. 2A, taking the structure from a table to a tree. In FIG. 2B, Orders 185 are at the top of the tree, as Orders 185 are at the left hand side of FIG. 2A. Three more keywords, Avg. Price 186A, Discount (Disc.) 186B, and Net 186C, are below Orders 185 in the tree of FIG. 2B, and to the right of Orders 185 in the table of FIG. 2A. Content in the form of 50,000

(Avg. Price 187A), 5,000 (Discount 186B), and 45,000 (Net 186C) are associated with keywords 186A-C as well as with keyword 185.

Keyword 190 (Delivery Charge) is associated with keyword 185 (Orders). Keywords 191-193 (Standard, Expedited, and Overnight) are associated with keyword 185. Content 196-198 (100, 200, and 400) are associated respectively with keywords 191-193, as well as with keyword 190.

Figure 3:
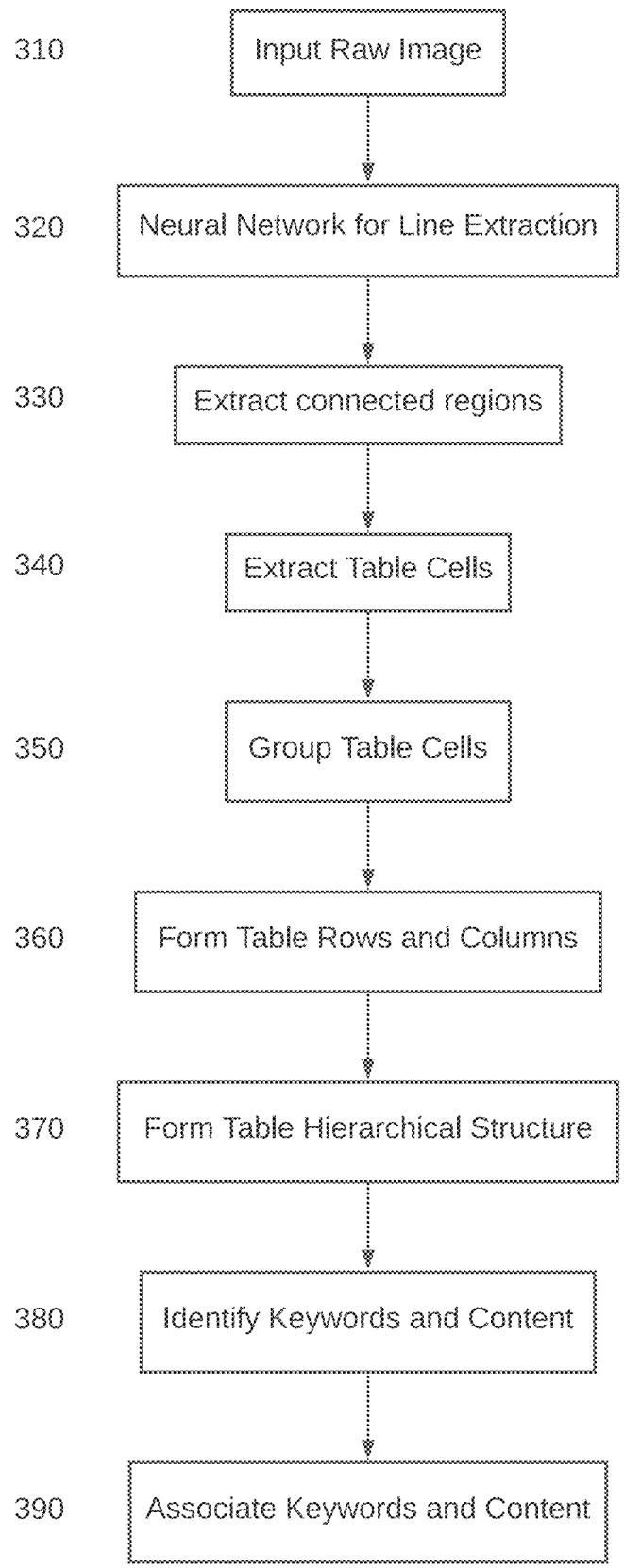
FIG. 3 is a flowchart depicting high-level flow of sequences of operation according to an embodiment.

FIG. 3 depicts, at a high level, workflow in accordance with an embodiment. At 310, a raw image is input. In an embodiment, the raw image may be an RGB image, though other formats are possible. At 320, a deep-learning based network may be constructed to enable line extraction in a given input image. According to different aspects, the deep learning network enables extraction of boundary lines of tables with either color blocks or broken or dashed lines. In an embodiment, the network may be a convolutional neural network (CNN). In another embodiment, the network may be a deep convolutional neural network (DCNN) or a fully convolutional neural network (FCN or FCNN).

At 330, connected regions may be identified and extracted using the extracted table lines. In an embodiment, the form from which the input image is taken may contain one or more colors or shades of color, or grayscale. An area having the same color or grayscale may be identified as having connected regions, using the extracted table lines. At 340, the cells themselves may be extracted using the connected regions, which may be indicated as being divided by the extracted table lines. A connected region may have one or more cells, depending on information that the extracted table lines provide. At 350, the extracted cells may be sorted or grouped in either a left to right (row) or a top to bottom (column) manner. The sorting or grouping may be carried out by working with neighboring cells. After sorting or grouping, at 360 table columns and rows are formed. In an embodiment, multiple tables in a virtual form may be identified, as noted earlier for example with respect to FIGS. 1A to 1C, which show tables 101 and 151 in the same form.

At 370, a hierarchical structure may be formed from the grouped columns and rows using geometrical alignment information. At 380, from input types that may be either handwritten or printed, it is possible to identify a particular cell as containing either a keyword or content. At 390, looking at the hierarchical structure as a tree, the corresponding contents from the leaf or branch nodes may be associated with or connected to a keyword root node. According to this overall process, then, it is possible to register a table, automatically extract useful information, and output keyword/content pairs.

The following discussion focuses on 330 from FIG. 3.

As noted earlier, table lines may be extracted using a deep learning based model. Where there are color cells, that color is input. Depending on the size of the cell and on what the cell contains, the colored area may be identified as a single cell, or as multiple cells. Line extraction is carried out to provide lines (in an embodiment, black and white lines) as borders of connected regions of the table, those connected regions being used to extrace table cells. Accordingly, in one aspect, table lines may be labelled manually on a pixel level.

Instead of color as the signifying input, there may be broken lines in the input form, or a lightly colored table, or a table with cells of different shades or colors. In all of these instances, in an embodiment the deep learning based model used to recognize and handle these different possible inputs may be a Semantic Segmentation Network, which in one embodiment may be an FCN segmentation network to handle pixel-wise input and output. In an aspect, the FCN segmentation may map an input image to a binary mask. Appropriate training sets for the deep learning based model will facilitate differentiating among these various table appearances, and will enable proper identification of keywords and content in the appropriate fields.

It is possible to extract and form a table from either traditional table structures (e.g. having a single or monolithic regular structure) or non-traditional table structures (e.g. perhaps having multiple table structures within a form). Using the connected region information from 330 in FIG. 3 and the preceding discussion, it is possible to extract individual table cells from the separated regions as noted in 340 in FIG. 3. In an embodiment, each individual cell may be marked and labeled from left to right, and from top to bottom.

FIGS. 4A-4E depict one approach to extracting individual cells. FIG. 4A shows a setup with a plurality of words, Word1 through Word7. FIG. 4B shows an example of highlighting of potential roots for a tree. This kind of highlighting will be discussed in more detail with respect to FIGS. 5A, 5B, 6A, and 6B.

FIG. 4C depicts a nested table (N-dimensional table) including multiple levels of keywords. In FIG. 4C, each individual cell is labeled from left to right, row by row, C1 to CN (in this example, N=14). Comparing FIGS. 4A and 4C, for example, Word1 corresponds to cell C0; Word5 corresponds to cell C1; Word2 and Word3 together correspond to cell C2; Word6 corresponds to cell C3; Word7 corresponds to cell C4; and Word4 corresponds to cell C9.

FIGS. 4D and 4E depict different nestings of keyword level. FIG. 4D shows a column-based nesting. C0, C1, C4, C7, and C8 have darkened boxes signifying their status as keyword cells. C0 and C1 are keywords; C4 is a keyword below C1; and C7 and C8 are keywords below C4. All cells below the darkened boxes (C2, C3, C5, C6, and C9-C14) signify content. Because FIG. 4D is a column-based nesting, if C1 is identified as a keyword, then if the identification of C0 is ambiguous for any reason, C0 will be determined to be a keyword because of its location relative to C1. Likewise, if C4 is identified as a keyword and the identification of C1 is ambiguous for any reason, C1 will be identified as a keyword because of its location relative to C4, and then C0 will be identified as a keyword. Finally, if either C7 or C8 is determined to be a keyword and the identification of C4 or C1 is ambiguous for any reason C4, and then C1, and then C0 will be identified as keywords because of their respective locations relative to each other and to C7 and C8.

FIG. 4E shows a row-based nesting. C0, C2, C9, C3, and C5 have darkened boxes signifying their status as keyword cells. C0 is a keyword; C2 is a keyword, with C3 and C5 as keywords to the right of C2; and C9 is a keyword. All cells to the right of the darkened boxes (C1, C4, C6 to C8, and C10 to C14) signify content. Because FIG. 4E is a row-based nesting, if C3 is identified as a keyword, then if the identification of C2 is ambiguous for any reason, C2 will be identified as a keyword because of its location relative to C3. Likewise, because of the location of C0 relative to the location of C2 which is a keyword, C0 also will be identified as a keyword. Likewise, if C5 is identified as a keyword and the identification of C2 is ambiguous for any reason, C2 will be identified as a keyword because of its location relative to C5, and then C0 will be identified as a keyword.

Figure 5A:
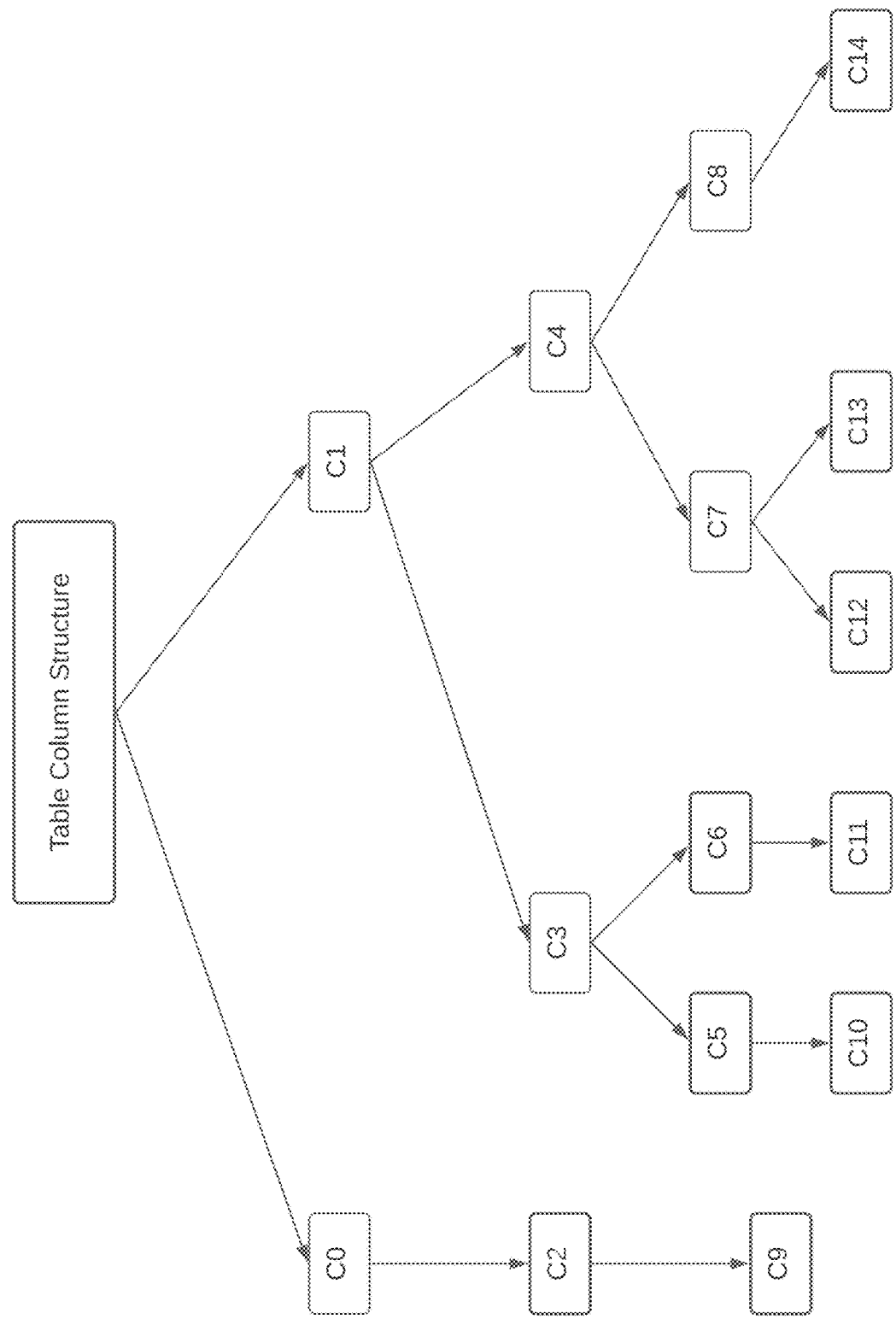
FIG. 5A is an example of a tree according to an embodiment.

Initially, a tree may be formed using column size information. FIG. 5A shows such a tree. In one aspect, to form the tree, the width of each individual cell from left to right and from top to bottom may be used. A node of the tree may be divided in two when a total width of the sub-cells equals the width of a corresponding root cell. For example, looking at FIG. 5A, on the first row, the overall table width equals the sum of the widths of cells C0 and C1. On the second level or row, the width of cell C4 is approximately the sum of the widths of cells C7 and C8, that is, $W_{C4} \approx W_{C7} + W_{C8}$. Therefore, it is possible to form two sub-nodes C7 and C8 that connect directly to cell C4. Also, the heights of cells C3 and C4 are approximately the same, that is, $H_{C3} \approx H_{C4}$. Therefore, C3 and C4 may be arranged as having the same level root node in the tree.

Figure 5B:
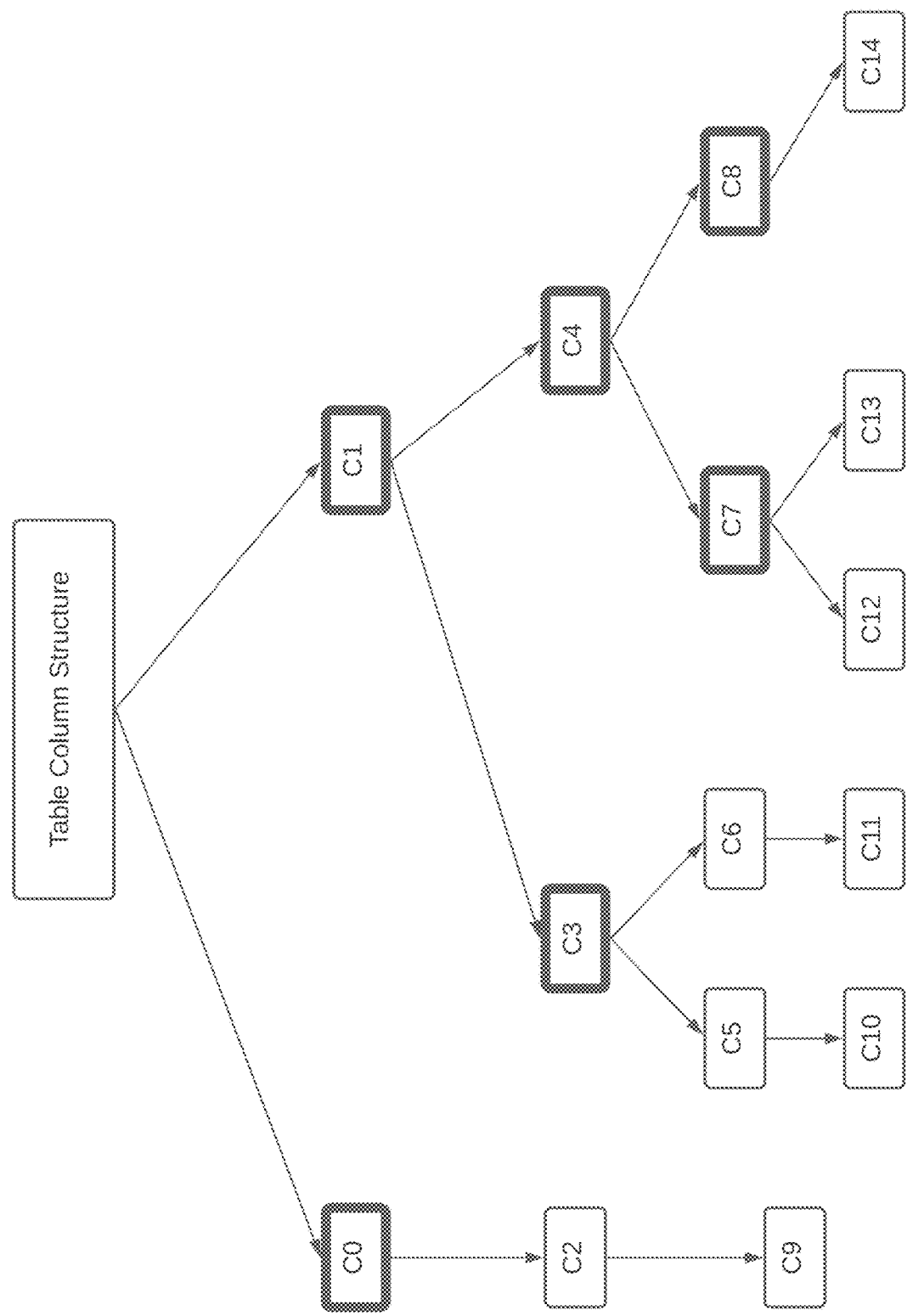
FIG. 5B shows FIG. 5A with certain nodes highlighted.

Thus, in FIG. 5B which also depicts a column-based hierarchical tree structure, each block in the tree represents an individual cell from the grouped and sorted table cells. Nodes that lead to other nodes are highlighted. The depth of the tree structure indicates the maximum number of rows in the column structure (in FIG. 5B, the depth is four, corresponding to the four rows in FIG. 5B). In FIG. 5B, cells C0 and C1 in the top row of the table are first level nodes, and cells C3 and C4 in the next row are second level nodes. Cells C7 and C8 in the third row are third level nodes.

Figure 6A:
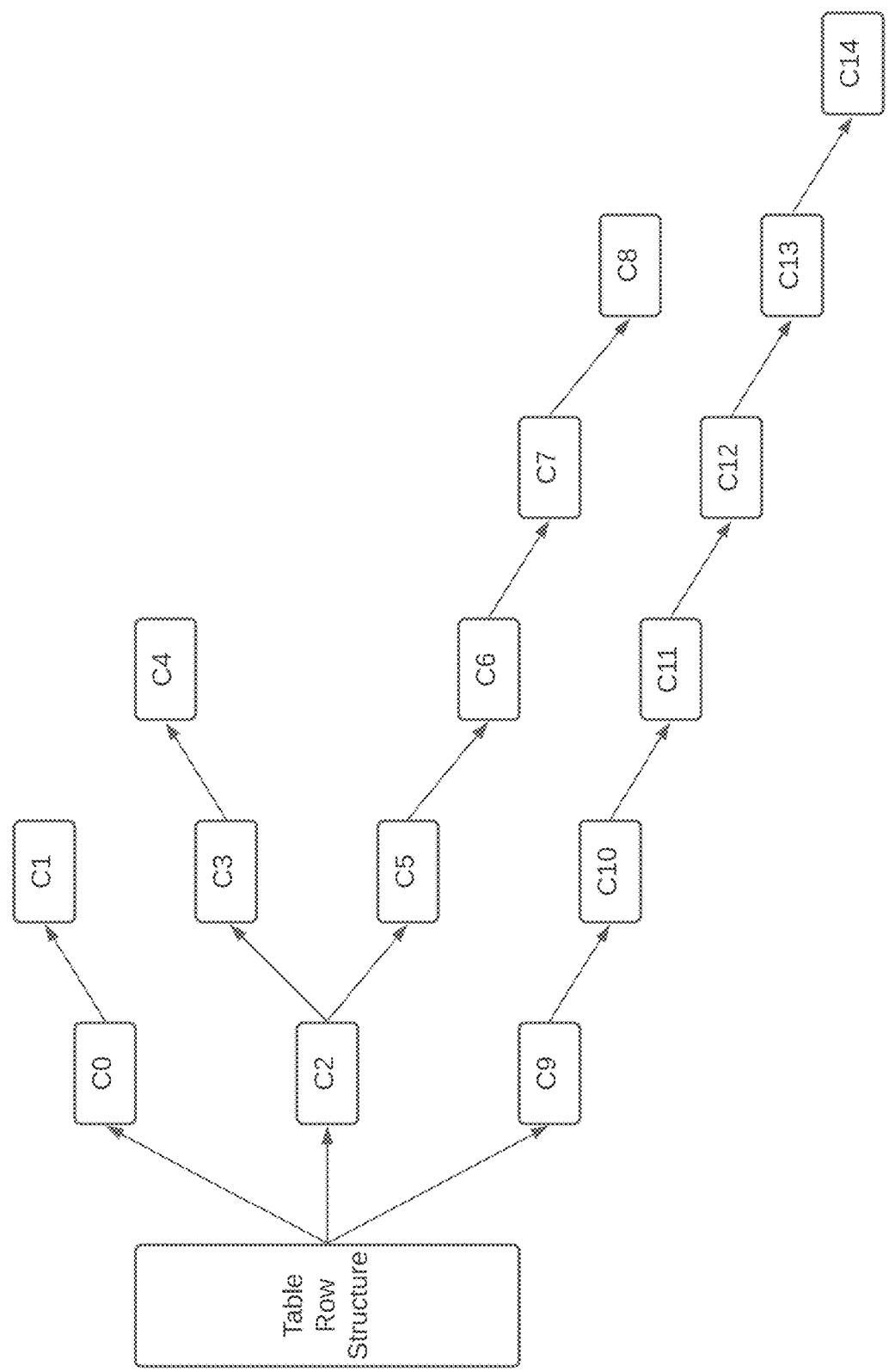
FIG. 6A is an example of a tree according to an embodiment.
Figure 6B:
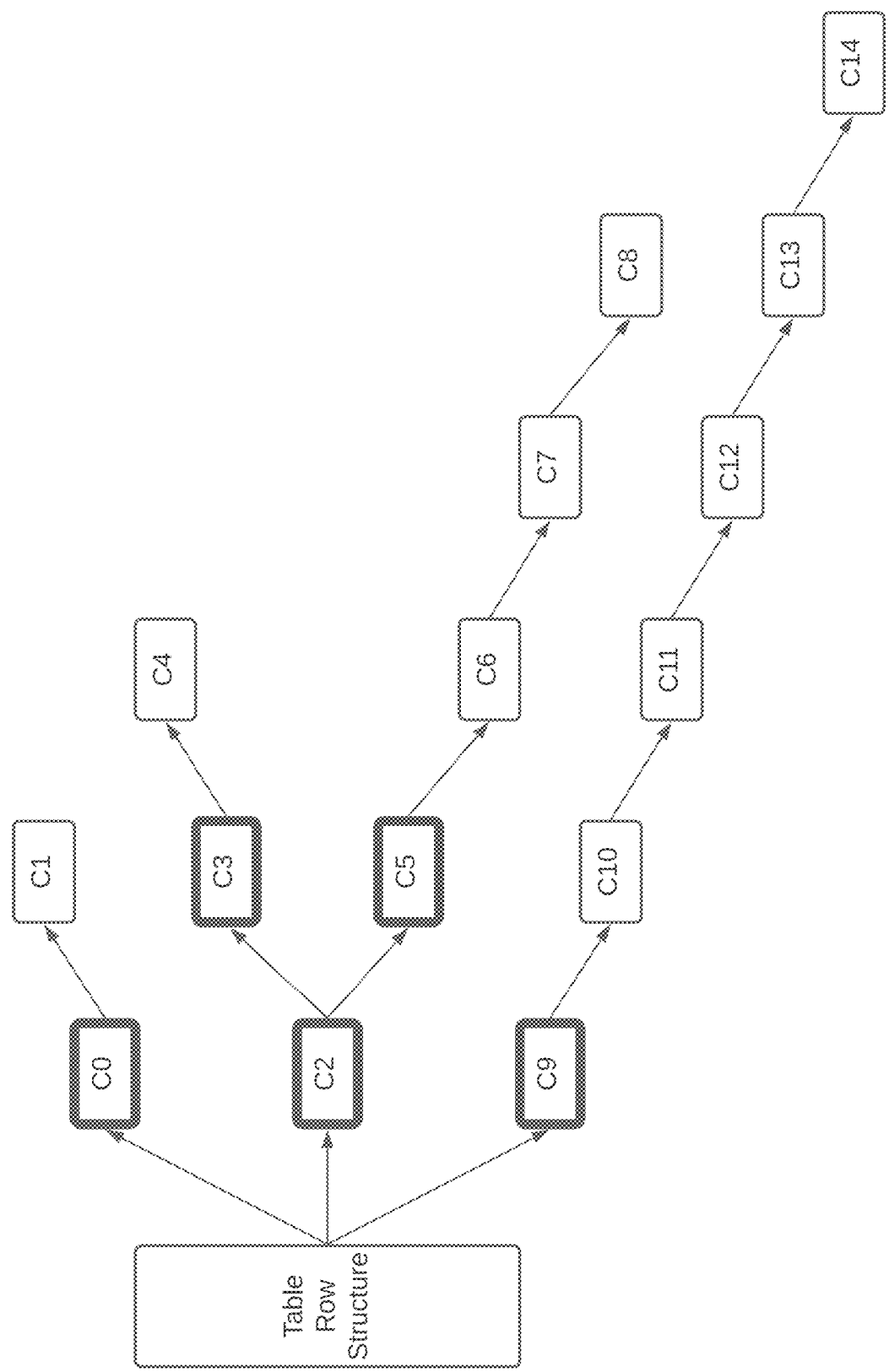
FIG. 6B shows FIG. 6A with certain nodes highlighted.

In a similar fashion, FIG. 6A depicts a row-based hierarchical tree structure, employing a similar concept to that for FIG. 5A. As in FIG. 5A, in FIG. 6A each block in the tree represents an individual cell from the grouped and sorted table cells. The depth of the tree structure indicates the maximum number of columns in the row structure (in FIG. 6A, the depth is six, corresponding to the six columns in FIG. 6A). In FIG. 6A, cells C0, C2, and C9 on the left hand side are first level nodes, and cells C1, C3, C5, C10, which are immediately to the right of cells C0, C2, and C9, are second level nodes. In FIG. 6B, nodes that lead to other nodes are highlighted, similarly to what FIG. 5B shows.

With the tree structure for the table cells identified, it is possible to identify the properties of the cells, using either handwritten or printed inputs in the table. In embodiments, a printed cell may be treated as containing a keyword, and a handwritten cell may be treated as content. In FIG. 5B and FIG. 6B, for column structure and row structure, respectively, keyword nodes are boxes with darker borders, and content nodes are boxes with lighter borders, corresponding to FIGS. 4D and 4E. It should be noted that, for a one-dimensional table, either a column tree or a row tree can be used to identify and associate content cells with keyword cells from each branch of the tree.

In one aspect, it is possible to translate the tree-based representations of FIGS. 5A and 5B, and FIGS. 6A and 6B into hierarchical text, using formats such as a JavaScript Object Notation (JSON) format, a hypertext markup language (HTML)-like format, or an extensible markup language (XML)-like format. Ordinarily skilled artisans will appreciate that other formats are possible.

In the following structures, the items before the colon represent keywords, and the items after the colon represent content. Thus, for example, the column-based structures of FIGS. 5A and 5B can be represented as the following data structure.

$$\left\{ \begin{array}{c} C_0:C_2, C_9; \\ C_1:\{\{C_3:\{C_5:C_{10}; C_6:C_{11}\};\}; \{C_4:\{\{C_7:C_{12}, C_{13}\}; \{C_8:C_{14}\};\};\};\} \end{array} \right\}_{Column}$$

Looking at the particular example of FIG. 5B, and referring to the foregoing discussion of FIG. 4D, C0 is a keyword, and C2 and C9 are content below C0. C1 also is a keyword. Below that, there are further keywords C3 and C4. Below C3 are content C5, with content C10 located below content C5, and content C6, with content C11 located below content C6. Below C4 are further keywords C7 and C8. Below keyword C7 are content C12 and C13, and below keyword C8 is content C14.

Similarly, the row-based structures of FIGS. 6A and 6B can be represented as the following data structure:

$$\left\{ \begin{array}{c} C_0:C_1; \\ C_2:\{\{C_3:C_4\}; \{C_5:C_6, C_7, C_8\}\}; \\ C_9:C_{10}, C_{11}, C_{12}, C_{13}, C_{14} \end{array} \right\}_{Row}$$

Looking at the particular example of FIG. 6B, and referring to the foregoing discussion of FIG. 4E, C0 is a keyword, and C1 is content to the right of C0. C2 also is a keyword, and has keyword C3 and C5 to its right. Keyword C3 has content C4 to its right. Keyword C5 has content C6, C7, and C8 to its right. Finally, C9 is a keyword with content C10, C11, C12, C13, and C14 to its right.

Figure 7:
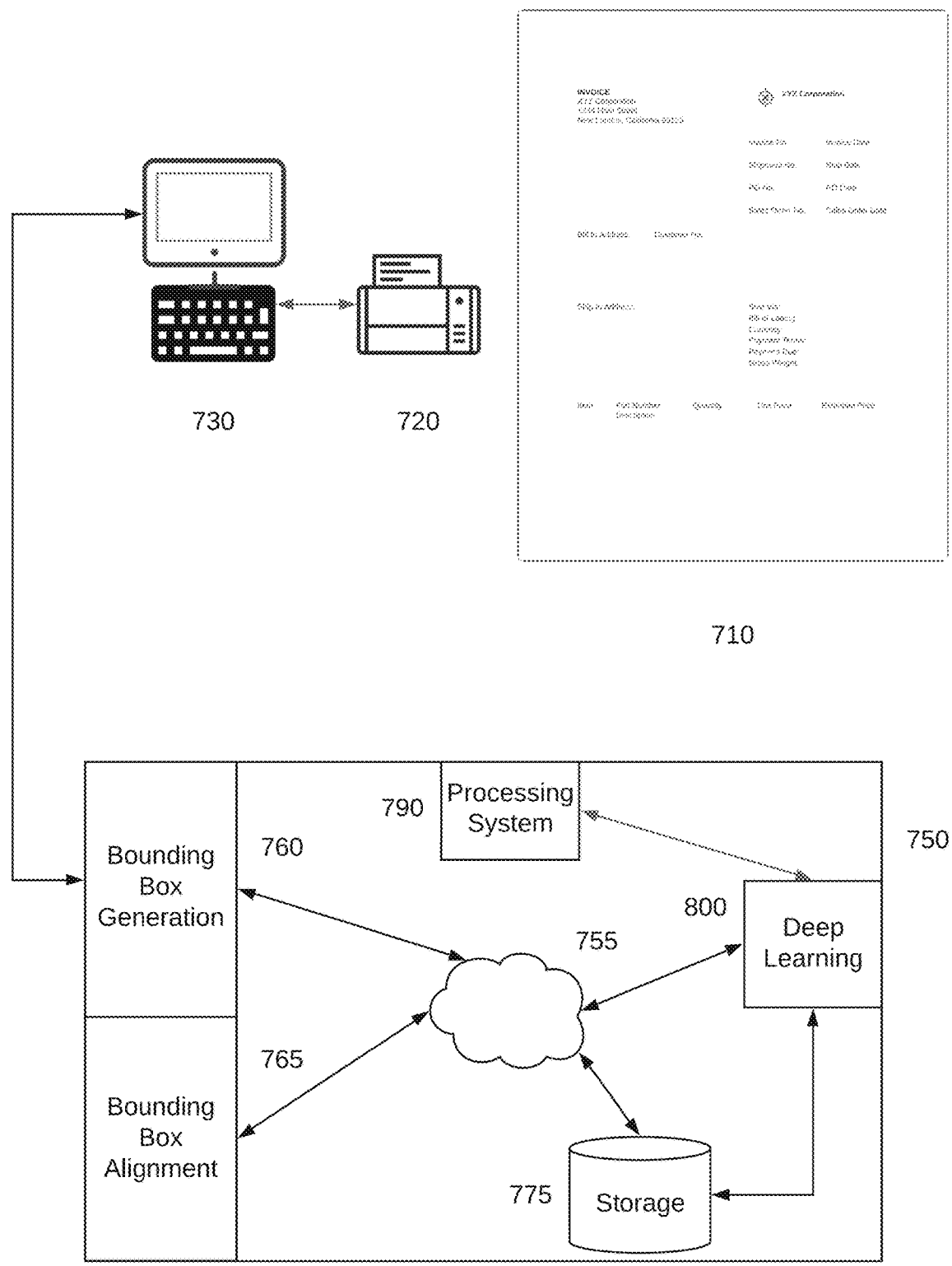
FIG. 7 is a high level block diagram of a system for implementing aspects of the invention according to embodiments.

FIG. 7 is a high level block diagram of a system to implement the method described herein. In FIG. 7, an input form 710 is input via scanner 720, which may be connected to computing system 750 either directly or through other computing apparatus 730. Scanning input form 710 produces an input image from which computing system 750 will identify keywords. As discussed earlier, the input image may be an RGB image. In an embodiment, the input image may be a grayscale image, or it may be a black and white image.

Computing system 750 will include one or more processors, one or more storage devices, and one or more solid-state memory systems (which are different from the storage devices, and which may include both non-transitory and transitory memory). In an embodiment, computing system 750 may include deep learning system 800, which will be described in more detail below.

Where deep learning system 800 is involved, a training set may include blank forms, from which the deep learning system 800 can discern locations of keywords. Once deep learning system 800 is able to discern locations of keywords, different blank forms can be input, and deep learning system 800 will be able to discern keyword locations. The system 800 also may be trained on filled-in forms, where keyword locations may be known. Where text is provided on the filled-in forms adjacent to keywords, the system 800 can be trained to recognize that text as content. Once the system 800 is trained, when different filled in forms are input, it then can be possible to discern locations of content associated with respective keywords, based on a location of content relative to a keyword (e.g. either immediately below, or immediately to the right of the keyword). Storage 775 may store scanned filled images, which have been referred to above as target images.

In an embodiment, where a form is as shown in FIGS. 1A to 1C, including with a bottom portion as shown in FIGS. 2A and 2B, there may be further keywords located next to other keywords (e.g. immediately below, or immediately to the right of the other keywords). In FIG. 2A, the keywords "Avg. Price," "Disc.," and "Net" appear to the right of the keyword "Orders". Content "50,000," "5,000," and "45,000" respectively appear to the right of the keywords "Avg. Price," "Disc.," and "Net". Also, the keywords "Std.," "Exped.," and "Overnt." appear to the right of the keyword "Delivery Charge". Content "100," "200," and "400" appear respectively below the keywords "Std.," "Exped.," and "Overnt."

As part of the discernment of keyword and content location, computing system 750 may generate bounding boxes around text, using bounding box generation system 760. In an embodiment, computing system 750 may include a bounding box alignment system 765 to align bounding boxes determined to be out of alignment. In an embodiment, storage 775 may store the input images that deep learning system 800 processes. Storage 775 also may store training sets, and/or the processed output of deep learning system 800, which may include identified keywords and content associated with particular input forms. As noted above, storage 775 also may store filled-in forms, which have been referred to earlier as target images.

Computing system 750 may be in a single location, with network 755 enabling communication among the various elements in computing system 750. Additionally or alternatively, one or more portions of computing system 750 may be remote from other portions, in which case network 755 may signify a cloud system for communication. In an embodiment, even where the various elements are co-located, network 755 may be a cloud-based system.

Additionally or alternatively, processing system 790, which may contain one or more of the processors, storage systems, and memory systems referenced above, may implement the regression algorithms mentioned herein to resolve locations for keywords and corresponding content. In an embodiment, processing system 790 communicates with deep learning system 800 to assist, for example, with weighting of nodes in the system 800.

Figure 8:
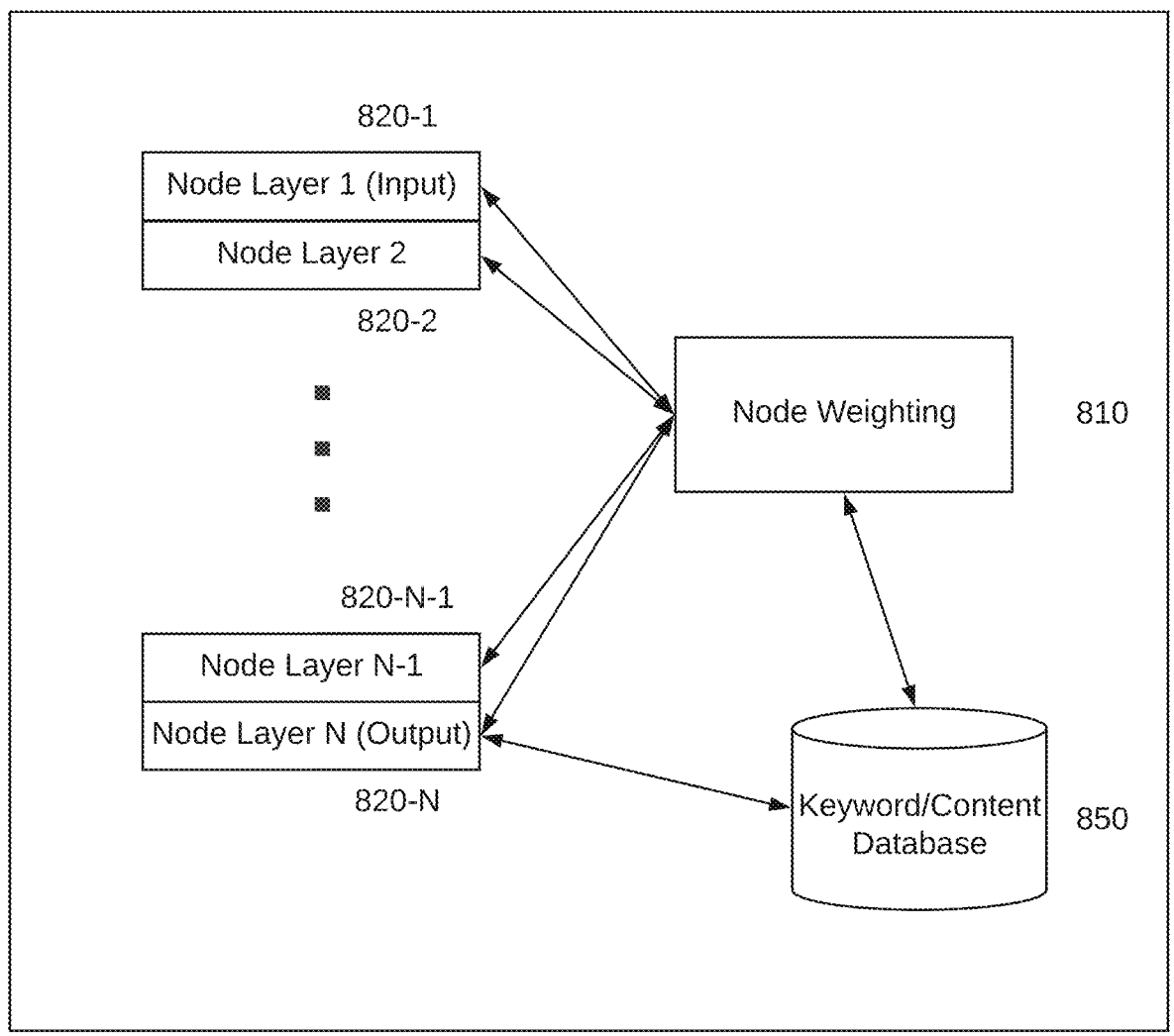
FIG. 8 is a high level block diagram of aspects of the system of FIG. 7.

FIG. 8 shows a slightly more detailed diagram of deep learning system 800.

Generally, deep learning system 800 will have processor, storage, and memory structure that ordinarily skilled artisans will recognize. A neural network, such as a CNN or a DCNN, will have a plurality of nodes arranged in layers 820-1 to 820-N as depicted. Layer 820-1 will be an input layer, and layer 820-N will be an output layer. According to different embodiments, N can be two or greater. If N is three or greater, there will be at least one hidden layer (for example, layer 820-2). If N equals two, there will be no hidden layer.

There will be an initial weighting provided to the nodes in the neural network. The weighting is adjusted, as ordinarily skilled artisans will appreciate, as modifications are necessary to accommodate the different situations that a training set will present to the system. As the system 800 identifies keywords and content, the output layer 820-N may provide the keywords and content to a keyword/content database 850. The database 850 also may store classifications of forms, with accompanying location of keywords and, where applicable, location of content relative to the keywords.

In an embodiment, once the keywords and content are identified, including in some cases a pattern of keywords and content, the keywords and content in each group may be paired using, for example, a linear assignment solver. According to embodiments, a constraint programming (CP) solver, an integer programming (IP) solver, or a mixed-integer programming (MIP) solver may be used. In other embodiments, a satisfiability (SAT) solver may be used, or a CP-SAT solver. Cost values between each keyword and corresponding content in the group may be computed using both geometric information and semantic information. In an embodiment, a cost $C_{ij}$, which indicates proximity of keywords (i) and content (j) to each other, may be calculated. The lower $C_{ij}$ is, the more likely the keywords and content are to be associated with each other. An exemplary formula is as follows:

$$C_{ij} = \alpha \cdot G_{ij} + \beta \cdot S_{ij}$$

$$G_{ij} = \sqrt{(x_i - x_j)^2 + (y_i - y_j)^2}$$

$$S_{ij} = \sqrt{\sum_{i=0}^{n} (m_n^i - n_n^j)^2}$$

$\alpha, \beta$—weights
$G_{ij}$—Geometric Distances
$S_{ij}$—Semantic Distances
$x_i, y_i$—Position of Keyword i
$x_j, y_j$—Position of Content j
$m_n^i$—Keyword i
$n_n^j$—Content j Ordinarily skilled artisans will appreciate that semantic distances can be measured directly by geometric distance, but also can be measured, for example, by forward neighbor rank, by backward neighbor rank, or by an arithmetic, geometric, or harmonic average of the two. In the foregoing equations, the semantic distance is measured as a Euclidean distance. In an embodiment, semantic distance may be measured by a distance measurement known as word mover's distance, which may be applicable when there is no common word in the respective text. Cosine distance also may be a type of semantic distance.

The calculated paired distances can form a cost matrix, in which the column and row correspond to keywords and content. The distances are elements of the matrix. Using a linear sum assignment algorithm, for example, it is possible to find the pairs that have the smallest distances in the matrix. In linear sum assignment, there is a constraint that each row can only be assigned to a column once. Therefore, each keyword can only have one corresponding content or content group to be assigned.

Using the linear sum assignment algorithm to resolve the keyword and content issue, it is possible to obtain the minimum cost of the paired distances. One benefit of the linear sum assignment is that, for each keyword, the constraint is not limited to association of a single piece of content. The algorithm finds all possible pairs that reaches the global minimum and best matches. In an embodiment, the assignment problem may be a so-called "unbalanced" problem, in which case the solver employed may address an unbalanced linear assignment problem.

One application of this type of cost calculation can be appreciated with reference to FIG. 2A which, as noted earlier, shows a hierarchy of keywords. Looking at the keywords and content in this figure, respective content in blocks 187A-C will be associated with keywords 186A-C, because the cost calculation will show these respective keyword-content pairs as closest to each other. To the right in FIG. 2A, cost calculations will show content in blocks 196-198 to be closest to keywords 191-193. Content in block 196 also may be shown as close to keyword 190. However, with the identified hierarchy of keywords, the content in blocks 196-198 will be associated properly with keywords 191-193 respectively.

Figure 9:
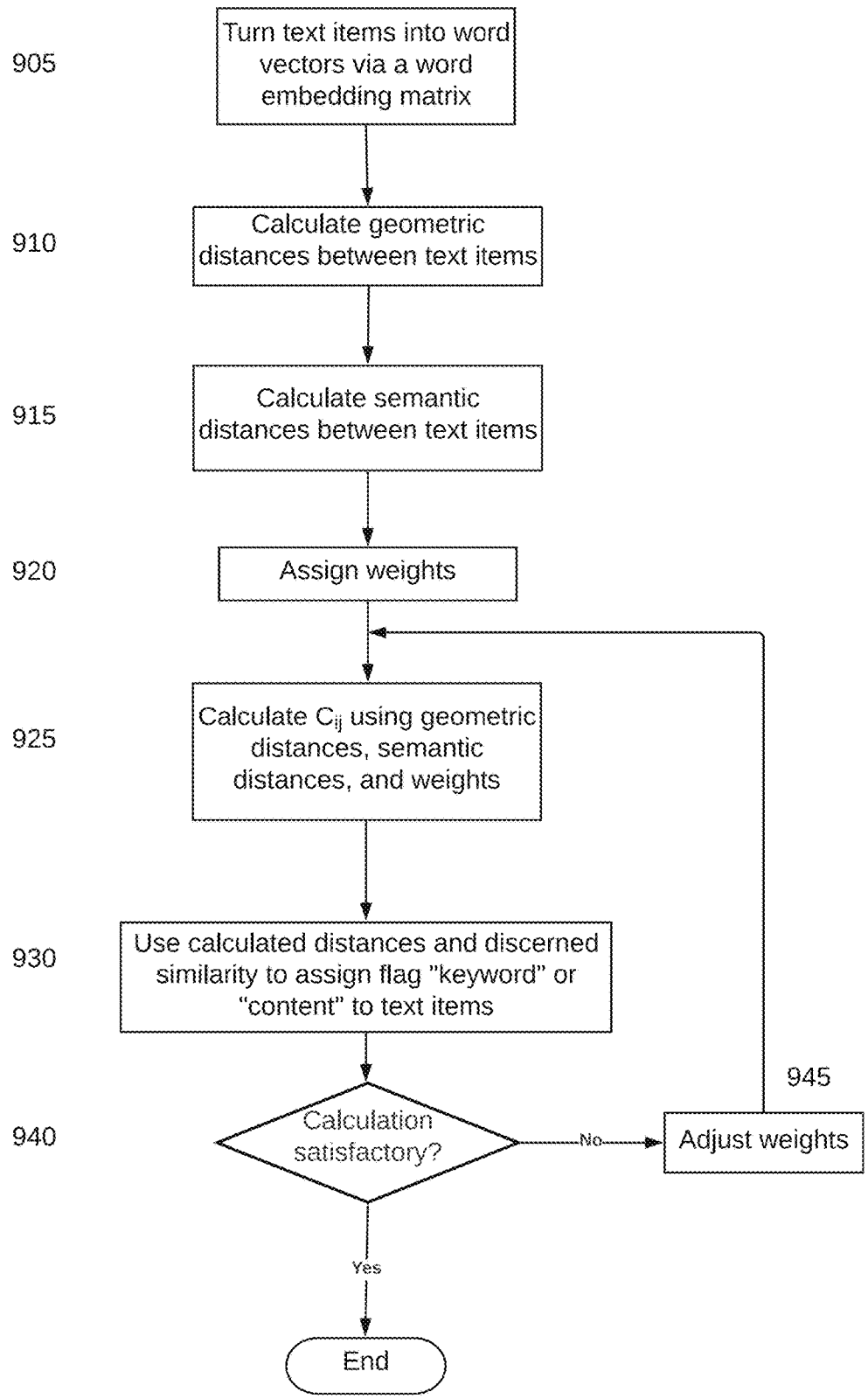
FIG. 9 is a flowchart depicting sequences of operation of determination of keywords and content according to an embodiment.

FIG. 9 summarizes the flow from the preceding discussion. At 905, text items (keywords or content) are turned into word vectors via a word embedding matrix, which may be trained by a deep learning model using a sufficiently large dataset. Ordinarily skilled artisans will appreciate the machine learning training required, particularly as the matrix can be very large, and can be trained a little at a time, for example, working only on the rows that are relevant at a particular training step. At 910, the geometric distances resulting from the word vectors determined via the trained word embedding matrix are calculated. At 915, the semantic distances resulting from the word vectors determined via the trained word embedding matrix are calculated.

At 920, weights are assigned. As just noted, geometric distance may be determined using Euclidean and semantic distances from a trained word embedding matrix. It is necessary to balance the two distance values using appropriate weights. For example, if the Euclidean distance is larger than the semantic distance, smaller magnitude weights may be used to balance the values. In this regard, in an embodiment the parameters are determined empirically. At 925, $C_{ij}$ is calculated using the calculated distances, and the weights assigned in the preceding steps. Ordinarily skilled artisans will appreciate that other types of solvers may present different types of equations to calculate the minimum distance, involving the same, similar, or different weights from the ones discussed above, or without such weights at all.

At 930, the calculated distances and the discerned similarity are used to assign a flag to the text items in question. The flag could signify either "keyword" or "content". At 940, if the calculation is satisfactory, the process ends. If the calculation is not satisfactory, then at 945 the weights are adjusted, and the flow returns to 925.

From the foregoing, it will be appreciated that embodiments according to the invention can take advantage of deep learning techniques, and mechanisms such as neural networks, more particularly convolutional neural networks (CNN), yet more particularly deep convolutional neural networks (DCNN) or fully convolutional neural networks (FCNN), to recognize patterns of keywords in blank forms, and positioning of content around keywords (e.g. to the right of keywords, or below keywords). With appropriate training sets of blank forms, and blank forms paired with their filled counterparts, it is possible to train a system appropriately to recognize a particular blank form, and to provide appropriate content fields to go with the keywords in the blank form.

While the foregoing describes embodiments according to aspects of the invention, the invention is not to be considered as limited to those embodiments or aspects. Ordinarily skilled artisans will appreciate variants of the invention within the scope and spirit of the appended claims.

What is claimed is:

1. A form auto-registration method comprising:
responsive to an input of a form, extracting one or more features from the form;
using a deep learning model, identifying lines from other features in the form, and extracting the lines;
using the deep learning model, identifying and extracting connected regions using the extracted lines;
using the deep learning model, identifying a table from the connected regions;
extracting cells from the identified table;
grouping the cells of the identified table using locations and sizes of adjacent cells in the identified table;
forming rows and columns in the identified table;
forming a hierarchy for the cells in the identified table using the grouping and one of the formed rows and the formed columns;
identifying adjacent keywords in the identified table using the formed hierarchy;
identifying content in the identified table using the formed hierarchy; and
associating respective identified adjacent keywords with respective identified content.

2. The form auto-registration method of claim 1, wherein the formed hierarchy in the identified table is a column hierarchy, with respective identified content appearing below identified adjacent keywords.

3. The form auto-registration method of claim 1, wherein the formed hierarchy in the identified table is a row hierarchy, with respective identified content appearing to the right of identified adjacent keywords.

4. The form auto-registration method of claim 1, wherein the deep learning model is selected from the group consisting of convolutional neural networks.

5. The form auto-registration method of claim 1, wherein the features are selected from the group consisting of a single color, multiple colors, or grayscale, and the identifying and extracting of lines comprises identifying one or more shaded regions in the form as a single color, multiple colors, or grayscale.

6. The form auto-registration method of claim 5, wherein the extracting of cells includes extracting of one or more cells from the one or more shaded regions.

7. The form auto-registration method of claim 6, wherein the extracting of the one or more cells from the one or more shaded regions further uses the extracted lines.

8. The form auto-registration method of claim 1, wherein the formed hierarchy is represented in a format selected from the group consisting of JavaScript Object Notation (JSON), hypertext markup language (HTML), and extensible markup language (XML).

9. The form auto-registration method of claim 1, wherein the associating comprises determining that content is associated with a particular keyword by identifying a lowest cost value $C_{ij}$, wherein $C_{ij}$ is determined as follows:

$$C_{ij} = \alpha \cdot G_{ij} + \beta \cdot S_{ij}$$

$\alpha, \beta$—weights $$G_{ij} = \sqrt{(x_i - x_j)^2 + (y_i - y_j)^2}$$

$x_i, y_i$—Position of Keyword i
$x_j, y_j$—Position of Content j
$G_{ij}$—Geometric Distance between keyword i and content j
$S_{ij}$—Semantic Distance between keyword i and content j.

10. The form auto-registration method of claim 9, wherein the semantic distance $S_{ij}$ is computed as a distance selected from the group consisting of a geometric distance, a forward rank (FR), a backward rank (BR), an arithmetic average of FR and BR, a geometric average of FR and BR, an harmonic average of FR and BR, a Euclidean distance, a word mover's distance, or a cosine distance.

11. A form auto-registration system comprising:
one or more processors;
one or more non-transitory memory devices; and
a deep learning system which implements a deep learning model;
the auto-registration system storing one or more programs in the one or more non-transitory memory devices, the one or more programs containing instructions which, when executed, perform the following:
responsive to an input of a form, extracting one or more features from the form;
using a deep learning model, identifying lines from other features in the form, and extracting the lines;
using the deep learning model, identifying and extracting connected regions using the extracted lines;

using the deep learning model, identifying a table from the connected regions;

extracting cells from the identified table;

grouping the cells of the identified table using locations and sizes of adjacent cells in the identified table;

forming rows and columns in the identified table;

forming a hierarchy for the cells in the identified table using the grouping and one of the formed rows and the formed columns;

identifying adjacent keywords in the identified table using the formed hierarchy;

identifying content in the identified table using the formed hierarchy; and associating respective identified adjacent keywords with respective content.

12. The form auto-registration system of claim 11, wherein the formed hierarchy in the identified table is a column hierarchy, with respective identified content appearing below identified adjacent keywords.

13. The form auto-registration system of claim 11, wherein the formed hierarchy in the identified table is a row hierarchy, with respective identified content appearing to the right of identified adjacent keywords.

14. The form auto-registration system of claim 11, wherein the deep learning model is selected from the group consisting of convolutional neural networks.

15. The form auto-registration system of claim 11, wherein the features are selected from the group consisting of a single color, multiple colors, or grayscale, and the identifying and extracting of lines comprises identifying one or more shaded regions in the form as a single color, multiple colors, or grayscale.

16. The form auto-registration system of claim 15, wherein the extracting of cells includes extracting of one or more cells from the one or more shaded regions.

17. The form auto-registration system of claim 16, wherein the extracting of the one or more cells from the one or more shaded regions further uses the extracted lines.

18. The form auto-registration system of claim 11, wherein the formed hierarchy is represented in a format selected from the group consisting of JavaScript Object Notation (JSON), hypertext markup language (HTML), and extensible markup language (XML).

19. The form auto-registration system of claim 11, wherein the associating comprises determining that content is associated with a particular keyword by identifying a lowest cost value $C_{ij}$, wherein $C_{ij}$ is determined as follows:

$$C_{ij} = \alpha \cdot G_{ij} + \beta \cdot S_{ij}$$

$\alpha, \beta$—weights $$G_{ij} = \sqrt{(x_i - x_j)^2 + (y_i - y_j)^2}$$

$x_i, y_i$—Position of Keyword i $x_j, y_j$—Position of Content j $G_{ij}$—Geometric Distance between keyword i and content j $S_{ij}$—Semantic Distance between keyword i and content j.

20. The form auto-registration system of claim 19, wherein the semantic distance $S_{ij}$ is computed as a distance selected from the group consisting of a geometric distance, a forward rank (FR), a backward rank (BR), an arithmetic average of FR and BR, a geometric average of FR and BR, an harmonic average of FR and BR, a Euclidean distance, a word mover's distance, or a cosine distance.

* * * * *